UNITED STATES PATENT OFFICE.

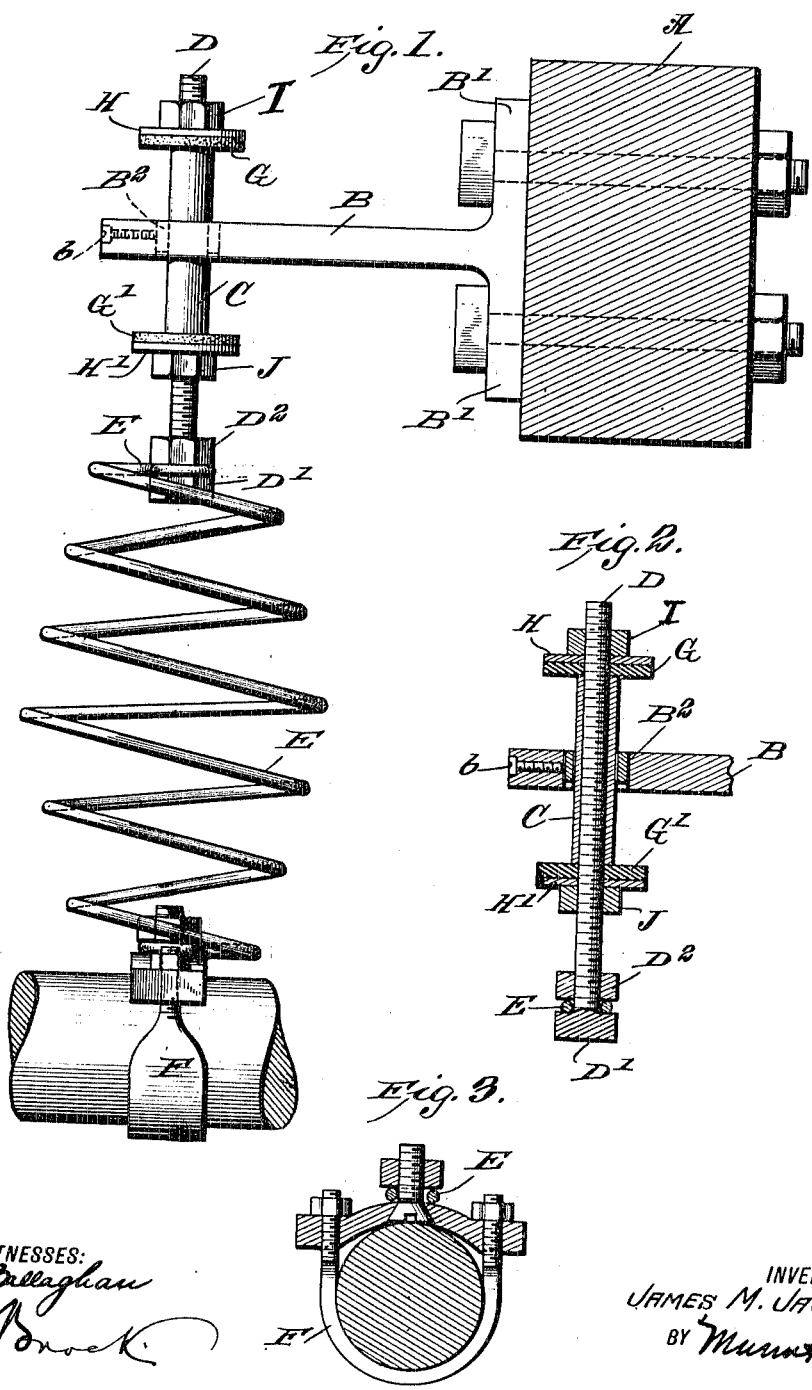

JAMES MADISON JACKSON, OF PARKERSBURG, WEST VIRGINIA.

SHOCK-ABSORBER.

986,921.

Specification of Letters Patent. Patented Mar. 14, 1911.

Application filed December 29, 1909, Serial No. 535,411. Renewed November 8, 1910. Serial No. 591,326.

*To all whom it may concern:*

Be it known that I, JAMES MADISON JACKSON, a citizen of the United States, and a resident of Parkersburg, in the county of Wood and State of West Virginia, have invented certain new and useful Improvements in Shock-Absorbers, of which the following is a specification.

My invention relates to improvements in devices, auxiliary to the ordinary spring gear, for absorbing the shock or jolts incident to automobiles passing over obstructions or depressions.

The object of my invention is to produce a simple, cheap and efficient device which can be applied to any automobile to act as an auxiliary to the ordinary spring gear to render the shock or jolts practically negligible when traveling at high speed and under normal conditions of travel.

My invention consists in certain novel features of construction, arrangement and combination of parts as will be hereinafter fully described and shown in the drawing, in which:—

Figure 1 is a view showing the device as viewed from the front or rear. Fig. 2 is a vertical section of a portion of the device. Fig. 3 is a section through axle, showing means of clamping lower end of spring to the axle.

In carrying out my invention, I attach to the frame A of an automobile the rigid bracket or hanger B which is securely bolted to the frame through the flanges B'. Near the outer end of the hanger a hole or opening is drilled and in this opening is fitted a steel bushing B², the upper edge of which will be substantially flush with the upper face of the hanger, while the lower end of the bushing does not reach quite to the lower face of the hanger. This bushing is retained within the hole in the hanger by a set screw *b*, the head of which fits into a countersunk socket in the outer face of the hanger. Fitted within the bushing is a metal cylinder C, through which passes a screw rod or bolt D having the head D' at its lower end; a coiled spring E is fastened at its upper end to the bolt D by clamping the end of the spring against the head D' by a nut D². The lower end of the spring E is fastened in the same way to the bottom hanger or clip F, said clip being secured to the axle, as shown. The spring is preferably made larger at its central portion, as shown in Fig. 1.

At the top of the cylinder C, I place a fiber washer G and on this a steel washer H, and then screw on the bolt D the nut I which clamps the washers G and H securely against the upper end of the cylinder C. At the lower end of the cylinder C, I similarly arrange the washers G' and H', the fiber washer G' and the steel washer H' being securely clamped by the jam nut J. The purpose of the fiber washers is to prevent the clicking noise that would result should metal washers come in contact with the metal hanger.

My shock absorber, it should be understood, is an auxiliary to the ordinary spring gear of the automobile, and under normal road conditions, will not come into action, as the cylinder C which plays through the bushing in the hanger is of sufficient length (say 1½ to 3 inches) to give no aid to the ordinary springs under ordinary conditions. If, now, abnormal road conditions are encountered, such as rocks, logs or deep ruts in the roadbed, the hanger and axle will approach each other and as soon as the hanger engages the fiber washers at either end of the cylinder C, the spring will be distended or compressed accordingly as the hanger travels upwardly or downwardly, or when the axle forces the spring upwardly or downwardly. Hence, it will be seen that the shock or jolt is gradually absorbed and will be hardly noticeable by persons riding in the automobile.

The device can be adjusted and regulated for varying conditions of car or road by means of the jam nuts I and J as by these the cylinder C can be adjusted along the length of the screw bar or bolt D.

I claim:—

1. A shock absorber for motor vehicles, consisting of a bracket or hanger secured to the frame of the vehicle, a coiled spring secured to the axle of the same, a rod extending upwardly from the upper end of the spring through the aforesaid hanger or bracket, and means for both regulating and limiting the vertical play of the rod through the hanger or bracket, said means located on the rod both above and below the bracket.

2. A shock absorber for motor vehicles consisting of a bracket or hanger adapted to be secured to the frame of the vehicle, a vertically disposed coiled spring secured to the axle of the same, a rod extending upwardly from the upper end of the spring through the aforesaid bracket or hanger, and vertically adjustable collars mounted on said rod above and below the bracket or hanger adapted to limit the up or down movement of said rod.

3. A shock absorber for vehicles consisting of a bracket or hanger adapted to be rigidly secured to the frame of the vehicle, a vertically disposed coiled spring secured to the axle of the same, a threaded rod extending upwardly from the upper end of the spring and through the bracket or hanger, and nuts threaded on said rod above and below said bracket or hanger adapted to limit and regulate the up or down play of said rod.

4. A shock absorber for motor vehicles consisting of a bracket or hanger adapted to be rigidly secured to the frame of the vehicle, said bracket having a vertical opening therethrough, a bushing rigidly secured in said opening, a vertically disposed coiled spring secured to the axle of the vehicle, a rod extending upwardly from the upper end of the spring and through the bushing in the bracket, and means on the rod both above and below the bracket for limiting the vertical movement of said rod through the bushing.

5. A shock absorber for motor vehicles consisting of a bracket or hanger adapted to be rigidly secured to the frame of the vehicle, said bracket having a vertical opening therethrough, a vertically disposed coiled spring secured to the axle of the vehicle, a rod extending upwardly from the upper end of the spring, and through the opening in the bracket, a sleeve surrounding said rod and passing through the aforesaid opening in the bracket, and adjustable collars mounted on the rod above and below the said sleeve adapted to regulate the movement of the sleeve on the rod and also to limit the up or down play of the rod.

6. A shock absorber for motor vehicles comprising a bracket or hanger adapted to be secured to the frame of the vehicle, said bracket having a vertical opening therethrough, a bushing secured in said opening, a vertically disposed coiled spring adapted to be secured to the axle of the vehicle, a threaded rod projecting upwardly from the upper end of the coiled spring, a vertically movable sleeve loosely surrounding said rod and passing through the bushing, and adjustable collars mounted on said rod at the upper and lower ends of the sleeve to regulate the movement of the sleeve on the rod and also to limit the up or down play of the rod.

7. A shock absorber for motor vehicles comprising a bracket or hanger adapted to be rigidly attached to the frame of the vehicle, said bracket having a vertical opening therethrough, a bushing rigidly secured in said opening, a vertically disposed coiled spring adapted to be rigidly secured at its lower end to the axle of the vehicle, a threaded rod secured at its lower end to the upper end of the spring and extending through the bushing in the bracket, a vertically movable sleeve loosely surrounding said threaded rod and extending through the bushing, sound deadening washers fitted on said rod at the upper and lower ends of the sleeve, and jam nuts mounted on the threaded rods above and below said washers whereby the sleeve may be vertically adjusted relative to the threaded rod and the up or down play of the rod limited.

JAMES MADISON JACKSON.

Witnesses:
SAUL B. STILES,
IRENE M. KELLY.